United States Patent
Longnecker et al.

(10) Patent No.: US 6,941,245 B2
(45) Date of Patent: Sep. 6, 2005

(54) METHOD AND SYSTEM FOR CONTROLLING ENGINE TEMPERATURE BY ENGINE DERATING

(75) Inventors: John Edward Longnecker, Livonia, MI (US); Leopold Super, Dearborn, MI (US); Richard Michael Avery, Jr., West Bloomfield, MI (US); Brian Lewallen, Lowell, MI (US)

(73) Assignee: Detroit Diesel Corporation, Detroit, MI (US)

( * ) Notice: Subject to any disclaimer, the term of this patent is extended or adjusted under 35 U.S.C. 154(b) by 38 days.

(21) Appl. No.: 10/654,326

(22) Filed: Sep. 3, 2003

(65) Prior Publication Data

US 2005/0049819 A1 Mar. 3, 2005

(51) Int. Cl.[7] .......................... G01N 37/00; G06F 19/00
(52) U.S. Cl. ........................................................ 702/184
(58) Field of Search ............................... 702/182–184, 702/127, 136

(56) References Cited

U.S. PATENT DOCUMENTS

| 4,368,705 A | 1/1983 | Stevenson et al. |
| 5,070,832 A | 12/1991 | Hapka et al. |
| 5,392,741 A | 2/1995 | Uzkan |
| 5,477,827 A | 12/1995 | Weisman, II et al. |
| 6,220,223 B1 * | 4/2001 | Weisman et al. ........... 123/436 |
| 6,240,354 B1 | 5/2001 | Yamada et al. |
| 6,305,348 B1 * | 10/2001 | Grosmougin et al. ....... 123/299 |
| 6,330,873 B1 * | 12/2001 | Letang et al. ............... 123/322 |
| 6,339,742 B2 * | 1/2002 | Weisman, II ............... 701/114 |
| 6,415,761 B1 * | 7/2002 | McKenzie ............. 123/198 D |
| 6,591,811 B2 | 7/2003 | Kaltenbrunn et al. |
| 2002/0069011 A1 * | 6/2002 | Hawkins et al. ............ 701/104 |
| 2002/0099496 A1 | 7/2002 | Weismann, II et al. |
| 2002/0147530 A1 * | 10/2002 | Tamagawa et al. ........... 701/22 |
| 2003/0023367 A1 | 1/2003 | Avery, Jr. et al. |
| 2003/0130772 A1 * | 7/2003 | Yanagida et al. ............. 701/22 |

FOREIGN PATENT DOCUMENTS

| EP | 0 507 500 A3 | 3/1992 |
| GB | 2 388 443 A | 11/2003 |
| WO | WO 99/18342 A1 | 4/1999 |
| WO | WO 01/98642 A1 | 12/2001 |

* cited by examiner

Primary Examiner—John Barlow
Assistant Examiner—Demetrius Pretlow
(74) Attorney, Agent, or Firm—Brooks Kushman P.C.

(57) ABSTRACT

A method and system for controlling engine temperature by derating torque output of the engine. The method and system operate in cooperation with an electronic control module which is programmable for controlling temperature in the engine by derating maximum engine torque output based on an engine temperature rate of change. This permits the derating to be finely tuned to maximize available torque.

20 Claims, 2 Drawing Sheets

METHOD AND SYSTEM FOR CONTROLLING ENGINE TEMPERATURE BY ENGINE DERATING

BACKGROUND OF THE INVENTION

1. Field of the Invention

The present invention relates to compression-ignition engines with electronic control modules programmable for controlling engine temperature by derating torque output of the engine.

2. Background Art

A vehicle engine can be damaged if overdriven at high engine temperatures. The temperatures at which the damage can occur vary depending on the engine. The upper limit temperature for safe engine operation often depends on the number of cylinders, and other structural parameters of the vehicle engine.

One means to prevent the engine from reaching relatively high temperatures relates to controllably reducing the engine temperature by torque derating. Torque derating generally relates to derating, i.e. controllably limiting, torque output of the engine relative to its normal torque output for the current engine operating conditions.

The derating prevents the engine from producing higher levels of torque, which consequently prevents the engine from operating at the elevated temperatures associated with the higher levels of torque. Because the torque levels producing the damaging temperatures are no longer reachable, the engine begins to cool. In this manner, the torque derating can be used to limit the engine from overheating or reaching other temperature levels which may cause damage, unnecessary wear, or produce other debilitating effects.

Past derating techniques were limited in that the derating was controlled relative to predefined temperature thresholds, typically an engine temperature representation based on a measured coolant temperature, oil temperature, or intake/exhaust air temperature.

These existing techniques are simplistic in that only a temperature measurement and a threshold are taken into consideration. There is a need for an enhanced technique that recognizes and overcomes shortcomings of these existing techniques.

SUMMARY OF THE INVENTION

It is, therefore, an object of the present invention to provide a method and system for use with compression-ignition engines to control engine derating. Preferably, the method and system operate in cooperation with an electronic control module which is programmable for controlling temperature in the engine by derating maximum engine torque output.

One aspect of the present invention relates to a method to control engine temperature by derating maximum engine torque. The method includes calculating a torque limiter which is used by an electronic control module to derate the maximum engine torque output. Preferably, the torque limiter is a percentage value, such as 90%, which can be used as a torque multiplier to derate the maximum engine torque output, i.e., 90% of the normal maximum engine torque output for the given operating conditions.

The torque limiter, in accordance with the present invention, is based on an engine temperature rate of change. This permits the derating to be finely tuned to maximize available torque while still providing sufficient derating to cool the engine temperature.

In particular, factoring in the temperature rate of change takes into consideration the historical nature of the changes in engine temperature so that the torque is not overly derated. Rather, the torque output is maximized, and over derating is limited, because the derating anticipates future engine temperature from the current temperature rate of change. As a result, the derating is smoother and the drivability of the vehicle is improved.

One aspect of the present invention relates to a system for controlling engine temperature by derating engine torque output. The system includes an electronic control module programmable to derate maximum engine torque output of an engine. In one embodiment of the present invention, the electronic control module, preferably, includes a microprocessor and a computer-readable medium which cooperatively operate with one or more system temperature sensors to calculate a torque limiter as a function of temperature rate of change.

DETAILED DESCRIPTION OF THE PREFERRED EMBODIMENT(S).

Figure 1:
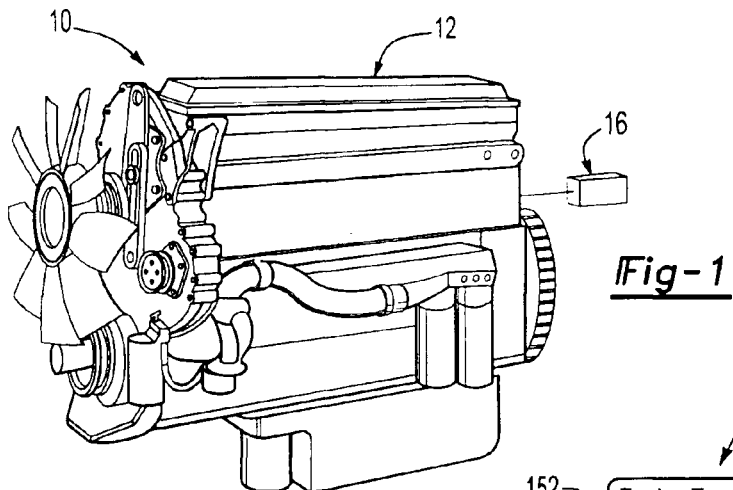
FIG. 1 illustrates a perspective view of a compression-ignition engine incorporating various features of the present invention.

FIG. 1 is a perspective view of a compression-ignition, internal combustion engine 10 incorporating various features of engine control according to the present invention. As will be appreciated by those of ordinary skill in the art, engine 10 may be used in a wide variety of equipment for applications including on-highway trucks, construction equipment, marine vessels, and generators, among others.

Engine 10 includes a plurality of cylinders disposed below a corresponding cover, indicated generally by reference numeral 12. In a preferred embodiment, engine 10 is a multi-cylinder compression-ignition internal combustion engine, such as a 4, 6, 8, 12, 16, or 24 cylinder diesel engine, for example. While the present invention is described with reference to a diesel engine, one of ordinary skill in the art will recognize that the present invention is not necessarily limited to compression-ignition engines and may be easily applied to a variety of internal combustion engine technologies.

Engine 10 includes an engine control module (ECM) 16. In operation, the engine control module 16 receives signals from various vehicle sensors and executes control logic embedded in hardware and/or software to control the engine 10. In a preferred embodiment, the engine control module 16 is a DDEC controller available from Detroit Diesel Corporation, Detroit, Mich. Various other features of this control module are described in detail in a number of different U.S. patents assigned to Detroit Diesel Corporation.

Figure 2:
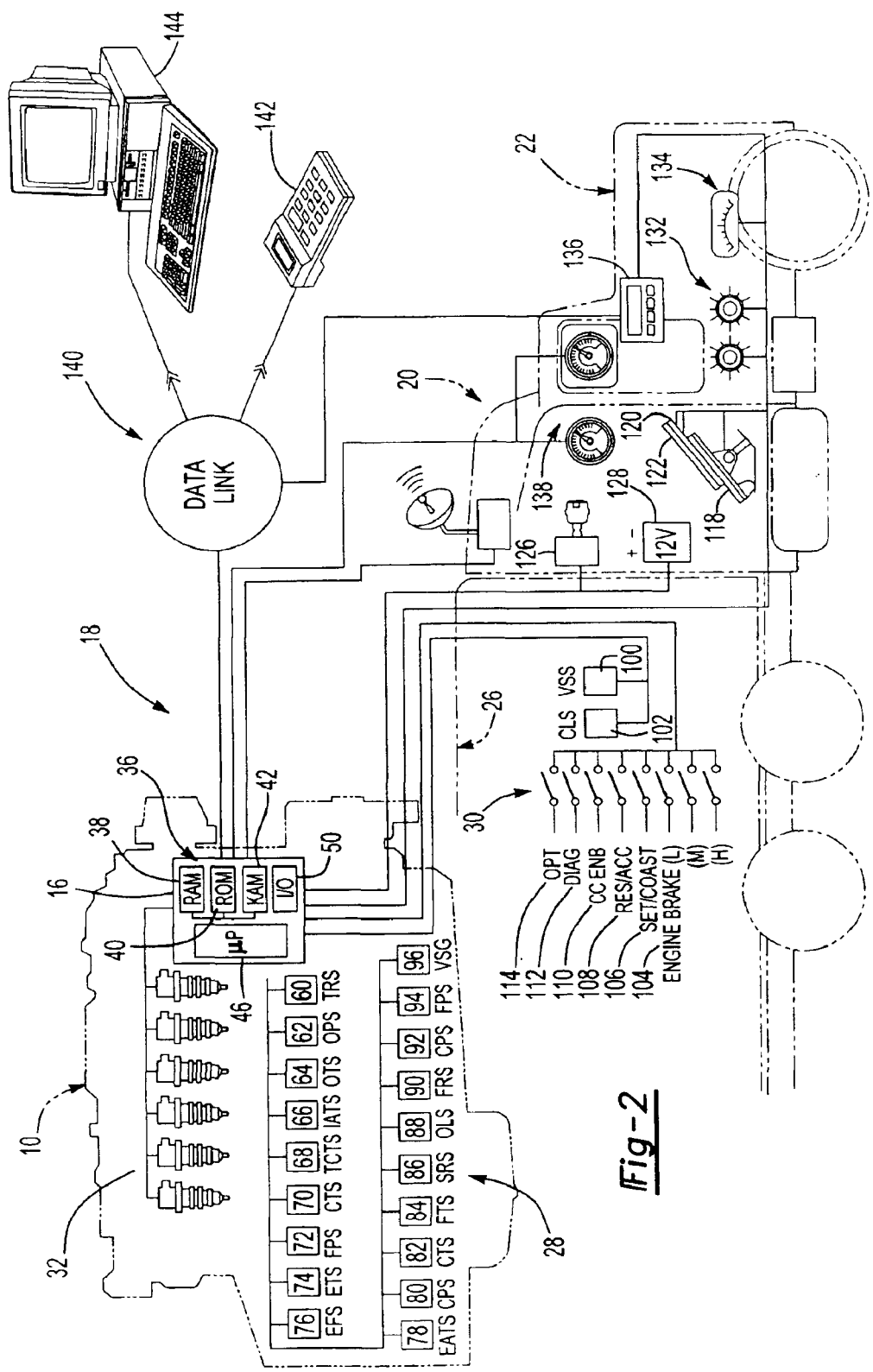
FIG. 2 illustrates a schematic diagram of a system for controlling torque derating in accordance with the present invention.

FIG. 2 provides a schematic/block diagram illustrating operation of a system 18 for controlling torque derating to limit the maximum engine torque output, thereby limiting the engine 10 from overheating or reaching other temperature levels which may cause damage, unnecessary wear, or produce other debilitating effects.

In one embodiment, the engine 10 is used to drive a vehicle 20 which includes a tractor 22 and semi-trailer 26. Diesel engine 10 is installed in tractor 22 and interfaces with various sensors and actuators located on engine 10, tractor 22, and semi-trailer 26 via engine and vehicle wiring harnesses, as appreciated by one having ordinary skill in the art. In other applications, engine 10 may be used to operate industrial and construction equipment, or in stationary applications for driving generators, compressors, and/or pumps and the like.

The electronic engine control module 16 receives signals generated by engine sensors 28 and vehicle sensors 30 and processes the signals to control engine and/or vehicle actuators such as fuel injectors 32. The engine control module 16 preferably includes computer-readable storage media, indicated generally by reference numeral 36 for storing data representing instructions executable by a computer to control engine 10.

Computer-readable storage media 36 may also include calibration information in addition to working variables, parameters, and the like. In one embodiment, computer-readable storage media 36 include a random access memory (RAM) 38 in addition to various non-volatile memory such as read-only memory (ROM) 40, and keep-alive or non-volatile memory (KAM) 42. Microprocessor 46 imparts control signals to, and receives signals from, input and output (I/O) drivers 50.

In a typical application, the engine control module 16 processes inputs from engine sensors 28, and vehicle sensors/switches 30 by executing instructions stored in computer-readable storage media 36 to generate appropriate output signals for control of engine 10, preferably in accordance with the present invention to control engine temperature by derating torque output of the engine 10.

In one embodiment of the present invention, engine sensors 28 include a timing reference sensor (TRS) 60, an oil pressure sensor (OPS) 62, an oil temperature sensor (OTS) 64, an intake air temperature sensor (IATS) 66, a turbo compressor outlet temperature sensor (TCTS) 68, a coolant temperature sensor (CTS) 70, a fuel pressure sensor (FPS) 72, an EGR temperature sensor (ETS) 74, an EGR flow sensor (EFS) 76, an exhaust air temperature sensor (EATS) 78, an coolant pressure sensor (CPS) 80, a coolant temperature sensor (CTS) 82, a fuel temperature sensor (FTS) 84, a synchronous reference sensor (SRS) 86, an oil level sensor (OLS) 88, a fuel restriction sensor (FRS) 90, a crankcase pressure sensor (CPS) 92, a fuel pressure sensor (FPS) 94, and a variable speed governor sensor (VSG) 96.

System 18 preferably includes various vehicle sensors/switches 30 to monitor vehicle operating parameters and driver input used in controlling vehicle 20 and engine 10. For example, vehicle sensors/switches 30 may include a vehicle speed sensor (VSS) 100 and a coolant level sensor (CLS) 102.

Switches used to select an engine operating mode or otherwise control operation of engine 10 or vehicle 20 may include an engine braking selection switch 104, cruise control switches set/coast 106, resume/acceleration 108, and cruise control enabler 110, a diagnostic switch 112, as well as various other optional, digital, and/or analog switches 114. The engine control module 16 also receives signals associated with an accelerator or foot pedal 118, a clutch 120, and a brake 122. The engine control module 16 may also monitor position of a key switch 126 and a system voltage provided by a vehicle battery 128.

The engine control module 16 may communicate with various vehicle output devices such as status indicators/lights 132, analog displays 134, digital displays 136, and various analog/digital gauges 138. An industry standard data link 140 can broadcast various status and/or control messages which may include engine speed, accelerator pedal position, vehicle speed, engine warnings or faults, and the like.

A service tool 142 may be periodically connected via data link 140 to program selected parameters stored in the engine control module 16 and/or receive diagnostic information from the engine control module 16. Likewise, a computer 144 may be connected with the appropriate software and hardware via data link 140 to transfer information to the engine control module 16 and receive various information relative to operation of engine 10, and/or vehicle 20.

As one of ordinary skill in the art will appreciate, depending upon the particular application, various sensors, switches, and components may be added or omitted as needed.

Figure 3:
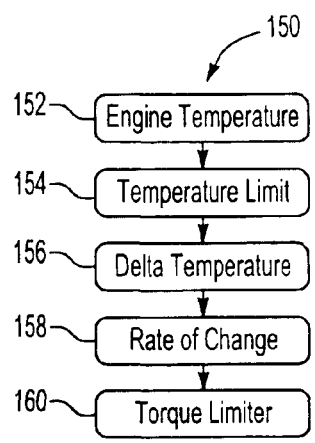
FIG. 3 illustrates a flowchart representing a method for implementation, to controllably reduce the engine temperature by torque derating in accordance with the present invention.

FIG. 3 illustrates a flowchart 150 representing a method for implementation by the electronic control module 16 in accordance with the present invention to controllably reduce the engine temperature by torque derating. Torque derating generally relates to derating, i.e. controllably limiting, the maximum allowable torque output of the engine 10 relative to its normal maximum torque output for the given engine operating conditions.

Because of the derating, the engine 10 is prevented from producing higher levels of torque, which consequently prevents the engine 10 from operating at the elevated temperatures associated with the higher levels of torque. In this manner, the torque derating can be used to limit the engine 10 from overheating or reaching other temperature levels which may cause damage, unnecessary wear, or produce other debilitating effects.

In accordance with the present invention, calculation of the torque limiter is based on an engine temperature rate of change. This permits the derating to be finely tuned to maximize available torque while still causing sufficient derating to cool the engine temperature.

In particular, factoring in the temperature rate of change takes into consideration the historical nature of the changes in engine temperature so that the torque is not overly derated. Rather, the torque output is maximized, and over derating is limited, because the derating anticipates future engine temperature changes, both increasing and decreasing temperature changes, from the current temperature rate of change. As a result, the derating is smoother and the drivability of the vehicle is improved.

A block 152 relates to the electronic control module determining a representative engine temperature for the engine 10. The engine temperature, preferably, is determined from one of the sensors describe above, or some combination thereof, as understood by one skilled in the art. As one of ordinary skill in the art will appreciate, the engine temperature can also be determine from non-temperature sensing devices, such a engine speed sensors or the like. Also, the engine temperature is a general term of art used to designate any heat exchanging portion of the engine 10 which can be calculated from the sensors, and is not limited to the engine block, engine cylinders, or any other portion or part of the engine.

In most cases, the engine temperature is determined from one or more of the gas and fluid sensors, such as the coolant temperature sensor 70, the oil temperature sensor 64, the intake manifold air temperature sensor 66, the exhaust manifold air temperature sensor 78, or the turbo compressor outlet air temperature sensor 68. However, other indicators and combinations of sensors could be used to determine the operating temperature.

A block 154 determines a predefined operating temperature limit, commonly referred to as a scaled high limit value. The predefined operating temperature limit is preferably a desired high temperature limit for the engine temperature in block 152. Typically, the predefined temperature limit equals some value greater than a target engine temperature. In this manner, the limit can be coordinated with vehicle operating conditions.

Generally, the predefined temperature limit is stored in memory in a look-up table based on the operating conditions of the vehicle. As such, it can be matched with a desired engine temperature for the current operating conditions. The predefined operating temperature limit could also be determined by an equation or other means of setting an benchmark temperature.

A block 156 calculates a delta temperature based on the difference between the temperature determined in block 152 and the temperature limit determined in block 154. The delta temperature value signifies a deviation of the current engine temperature relative to the high temperature limit for the engine 10.

Preferably, the delta temperature is positive, indicating the engine temperature is less than the predefined operating temperature limit (scaled high limit). The positive value indicates the engine temperature is less that the high limit engine temperature set in block 154. A negative value indicates the engine temperature is greater than the predefined operating temperature.

The positive delta valves control derating and the negative delta value control other action, such as engine shut-down. In detail, the positive values indicate it is acceptable to permit the engine to produce torque. The negative values, however, indicate the temperature limit is surpassed, meaning the engine 10 should be shut down rather than being allowed to continue torque production. In response to positive delta values, it is desirable to derate engine torque output unless the positive value is sufficiently large to indicate the engine is running well below the high limit temperature. Typically, the derating range below the limit from block 154 is up to 8° C., but of course, this varies and it can be dependent on the engine type.

By derating the engine torque output, the maximum torque the engine can produce for the given operating condition decreases. The engine temperature is generally proportion torque output, as such, the decreased torque produces decreased engine temperatures.

Preferably, the derated torque is not overly derated as it is desirable to maintain the highest possible performance for the engine. This means the engine temperature rate of change should be taken into consideration so that torque derating can be reduced if it appears as though the derating is cooling the engine temperature and the inertia of the cooling is likely to continue.

In other words, once cooling or heating begins, the rate of temperature change can be used to anticipate whether the current temperature trend is likely to continue.

A block 158 determines a rate of change for the engine temperature. The rate of change is determined by the electronic control module monitoring the engine temperature for a predefined period of time, typically one second. At the end of the period, the electronic control module determines how rapidly the engine temperature increased or decreased over the time period. This value becomes the temperature rate of change.

Because the rate of change calculation is an average taken over a period of time, the engine temperature determined in block 152 is determined at the end of the time period used in block 156 to calculate the rate of change.

A block 160 calculates a torque limiter based on the delta temperature and the temperature rate of change. The torque limiter, preferably, is a percentage value which indicates a percentage derating of the maximum engine torque output relative to the normal maximum engine torque output operation for the given operating conditions.

For example, a percentage value of 100% would indicate no effective torque derating as the engine would be permitted to provide 100% of the maximum engine torque it would normally provide for the given operating conditions. A percentage value of 90%, however, would derate the outputted engine torque to 90% of the maximum engine torque it would normally be able to provide for the given operating conditions. In this manner, various torque commands can be received, and only torque commands which request torque beyond the derated maximum engine torque output are limited.

Preferably, the torque limiter is calculated from a look-up table of percentage values stored in memory on the electronic control module as a function of the delta temperature and the temperature rate of change.

Figure 4:
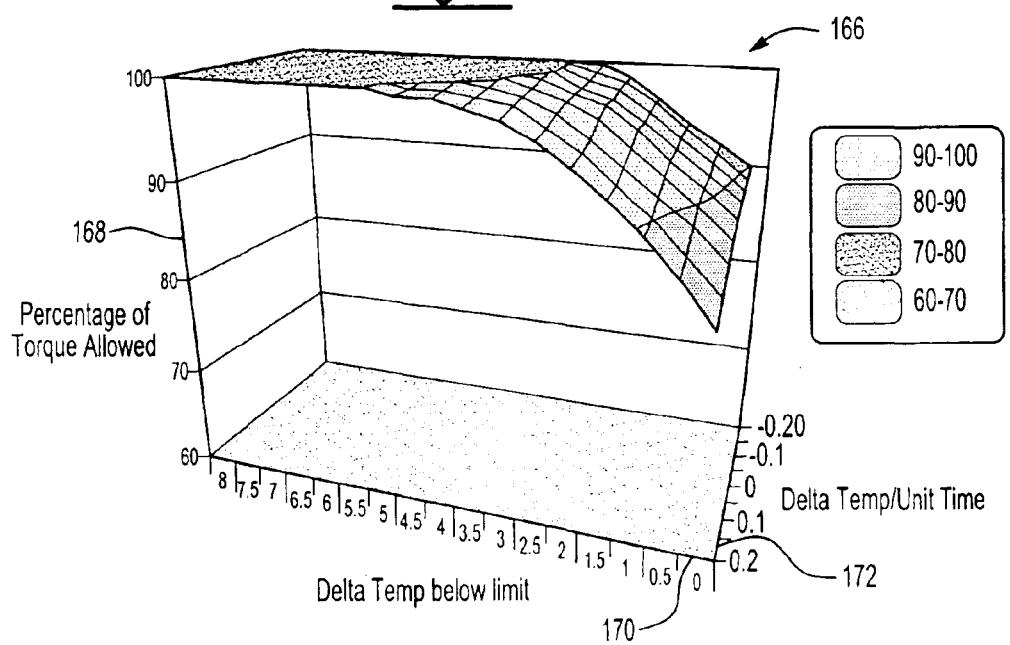
FIG. 4 graphically illustrates an exemplary look-up table which may be used to determine the percentage value of a torque limiter in accordance with the present invention.

FIG. 4 graphically illustrates an exemplary look-up table 166 which may be used by the electronic control module to determine the percentage value of the torque limiter. The graphed values correspond to the table shown below.

|  |  | Rate of Change (° C./Sec) | | | | |
|---|---|---|---|---|---|---|
|  |  | −0.2 | −0.15 | −0.1 | −0.05 | 0 |
| Delta Temperature (° C.) | 0 | 8980.3900% | 8941.1800% | 8901.9600% | 8862.7500% | 8784.3100% |
|  | 0.5 | 9215.6900% | 9176.4700% | 9137.2500% | 9098.0400% | 9058.8200% |
|  | 1 | 9411.7600% | 9411.7600% | 9372.5500% | 9333.3300% | 9294.1200% |
|  | 1.5 | 9647.0600% | 9647.0600% | 9607.8400% | 9568.6300% | 9568.6300% |
|  | 2 | 9843.1400% | 9843.1400% | 9803.9200% | 9764.7100% | 9764.7100% |
|  | 2.5 | 9960.7800% | 9921.5700% | 9882.3500% | 9843.1400% | 9843.1400% |
|  | 3 | 10000.0000% | 10000.0000% | 10000.0000% | 10000.0000% | 9960.7800% |
|  | 3.5 | 10000.0000% | 10000.0000% | 10000.0000% | 10000.0000% | 10000.0000% |
|  | 4 | 10000.0000% | 10000.0000% | 10000.0000% | 10000.0000% | 10000.0000% |

-continued

| | | | | | |
|---|---|---|---|---|---|
| 4.5 | 10000.0000% | 10000.0000% | 10000.0000% | 10000.0000% | 10000.0000% |
| 5 | 10000.0000% | 10000.0000% | 10000.0000% | 10000.0000% | 10000.0000% |
| 5.5 | 10000.0000% | 10000.0000% | 10000.0000% | 10000.0000% | 10000.0000% |
| 6 | 10000.0000% | 10000.0000% | 10000.0000% | 10000.0000% | 10000.0000% |
| 6.5 | 10000.0000% | 10000.0000% | 10000.0000% | 10000.0000% | 10000.0000% |
| 7 | 10000.0000% | 10000.0000% | 10000.0000% | 10000.0000% | 10000.0000% |
| 7.5 | 10000.0000% | 10000.0000% | 10000.0000% | 10000.0000% | 10000.0000% |
| 8 | 10000.0000% | 10000.0000% | 10000.0000% | 10000.0000% | 10000.0000% |

| | | Rate of Change (° C./Sec) | | | |
|---|---|---|---|---|---|
| | | 0.05 | 0.1 | 0.15 | 0.2 |
| Delta Temperature (° C.) | 0 | 8666.6700% | 8549.0200% | 8352.9400% | 8196.0800% |
| | 0.5 | 8980.3900% | 8862.7500% | 8705.8800% | 8588.2400% |
| | 1 | 9215.6900% | 9098.0400% | 9019.6100% | 8941.1800% |
| | 1.5 | 9450.9800% | 9333.3300% | 9254.9000% | 9215.6900% |
| | 2 | 9686.2700% | 9568.6300% | 9490.2000% | 9450.9800% |
| | 2.5 | 9803.9200% | 9764.7100% | 9686.2700% | 9647.0600% |
| | 3 | 9921.5700% | 9882.3500% | 9843.1400% | 9803.9200% |
| | 3.5 | 10000.0000% | 9960.7800% | 9921.5700% | 9882.3500% |
| | 4 | 10000.0000% | 10000.0000% | 9960.7800% | 9960.7800% |
| | 4.5 | 10000.0000% | 10000.0000% | 9960.7800% | 9960.7800% |
| | 5 | 10000.0000% | 10000.0000% | 10000.0000% | 10000.0000% |
| | 5.5 | 10000.0000% | 10000.0000% | 10000.0000% | 10000.0000% |
| | 6 | 10000.0000% | 10000.0000% | 10000.0000% | 10000.0000% |
| | 6.5 | 10000.0000% | 10000.0000% | 10000.0000% | 10000.0000% |
| | 7 | 10000.0000% | 10000.0000% | 10000.0000% | 10000.0000% |
| | 7.5 | 10000.0000% | 10000.0000% | 10000.0000% | 10000.0000% |
| | 8 | 10000.0000% | 10000.0000% | 10000.0000% | 10000.0000% |

As shown, a z-axis 168 corresponds with the percentage value of torque derating, an x-axis 170 corresponds with the delta temperatures less than the predefined temperature limit, a y-axis 172 corresponds with the temperature rate of change where increasing temperature is shown with positive values and decreasing temperature changes are shown with negative values. In this manner, the torque derating takes into consideration temperature inertia of the engine as the torque limiter is based on the total temperature change (delta temperature) and how rapidly the temperature changes (rate of change).

The torque limiter, however, can also be calculated an algorithm including a relationship similar to that shown above in the Table and FIG. 4. The algorithm can be advantageous to extrapolate the percentage values for any combination of delta temperature and temperature rate of change. Of course, the look-up table to could be expanded to include a broader range of percentage values as well as with more precise increments for delta temperature and temperature rate of change.

As the Table and FIG. 4 show, an increasing temperature rate of change (positive values) for the same delta temperature receives a greater level of torque derating. The greater derating takes place to produce greater temperature compensation for positive rates of change than the temperature compensation that would occur for the same delta temperature having less of rate of change.

Such variable control advantageously tracks the engine temperature rate of change as more derating is needed if the engine temperature is rapidly increasing or decreasing than is needed for the same temperature if the engine temperature was more slowly changing. The derating logic of the present invention anticipates future engine temperature such that the engine temperature will continue to rise if the rate of change is rapid, and therefore, require greater derating to slow the inertia of the rising temperature.

Likewise, if the engine temperature is rapidly decreasing, then the engine can be permitted to produce more torque than it would otherwise be permitted to produce for the same temperature if the engine was more slowly decreasing. This derating logic incorporates the decreasing temperature inertia principle that the engine temperature will continue to decrease if the rate of change is rapid, and therefore, require less derating is necessary as the cooling inertia of the decreasing temperature is likely to keep cooling the engine.

Moreover, the incorporation of the delta temperature value with the temperature rate of change further enhances the ability of the present invention to compensate torque derating based on engine temperature rate of change. Advantageously, the delta temperature tunes and prevents the temperature rate of change from over controlling the derating.

It is undesirable to derate the torque in some cases even if the temperature rate of change is rapid if the delta temperature value indicates the engine temperature is sufficiently below the high temperature limit. On the other hand, as the engine temperature begins to approach the high limit, the effect of the temperature rate of change becomes more important. As such, the delta temperature value allows the temperature inertia to be tuned relative to the high limit such that more freedom is given to temperature change rates at large delta temperatures than at low delta temperatures.

The derating is preferably a dynamic real-time process such that the electronic control module can continuously monitor the derating and make quick adjustments to maintain peak engine performance.

Advantageously, because the torque limiter takes into consideration the temperature rate of change for the engine, the electronic control module is able to anticipate increases and decreases in engine temperature as a function of the delta temperature and the temperature rate of change instead of simply relying on a temperature threshold.

As described above, the present invention takes into account the temperature inertia of the engine when derating torque by calculating the torque limiter as a function of delta temperature and temperature rate of change. In this manner, the present invention provides a method and system for use with compression-ignition engines to control engine derating by taking into account engine temperature rate of change. The method and system operate in cooperation with an electronic control module programmable for controlling temperature in the engine by derating engine torque output.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method to control engine temperature by derating engine torque, the method comprising:
    calculating a first delta temperature equal to a difference in temperature between a first engine temperature determined during operation of the engine and a predefined operating temperature limit;
    calculating a first temperature rate of change for the engine, the first temperature rate of change corresponding with a change in engine temperature over a first period of time;
    determining a first torque limiter for use in derating engine torque, the first torque limiter based on the first delta temperature and the first temperature rate of change; and
    controlling an engine control module to derate engine torque based on the first torque limiter.

2. The method of claim 1 further comprising the engine control module controlling a maximum torque output of the engine based on the first torque limiter.

3. The method of claim 2 further comprising calculating a second delta temperature equal to a difference in temperature between a second engine temperature determined during operation of the engine and the predefined temperature limit, the second delta temperature less than the first delta temperature and less than a predefined delta temperature limit, calculating a second torque limiter and derating engine torque based on the second torque limiter, wherein the second torque limiter increases engine torque output relative to the engine derating caused by the first torque estimate.

4. The method of claim 2 further comprising calculating a second delta temperature equal to a difference in temperature between a second engine temperature determined during operation of the engine and the predefined temperature limit, the second delta temperature greater than a predefined delta temperature limit, calculating a second torque limiter and derating engine torque based on the second torque limiter, wherein the second torque limiter at least maintains engine torque output derated by the first torque estimate.

5. The method of claim 4 wherein calculating the second torque limiter comprises calculating a second temperature rate of change for the engine, the second temperature rate of change corresponding with a change in engine temperature over a second period of time, the second torque limiter based on the second delta temperature and the second temperature rate of change.

6. The method of claim 1 wherein determining the first torque limiter comprises selecting the first torque limiter from a look-up table including a percentage value for the first torque limiter as a function of the first delta temperature and the first temperature rate of change.

7. The method of claim 1 wherein determining the engine temperature comprises determining engine coolant temperature.

8. The method of claim 1 wherein determining the engine temperature comprises determining engine oil temperature.

9. The method of claim 1 wherein determining the engine temperature comprises determining turbocharger compressor outlet air temperature.

10. The method of claim 1 wherein determining the engine temperature comprises determining intake manifold air temperature.

11. The method of claim 1 wherein determining the engine temperature comprises determining the engine temperature for an compression-ignition engine.

12. The method of claim 1 wherein determining the engine temperature comprises determining the engine temperature for a diesel engine.

13. An engine control module for use with a compression-ignition internal combustion engine, the module comprising,
    a means for calculating a first delta temperature equal to a difference in temperature between a first engine temperature determined during operation of the engine and a predefined operating temperature limit;
    a means for calculating a first temperature rate of change for the engine, the first temperature rate of change corresponding with a change in engine temperature over a first period of time;
    a means for determining a first torque limiter for use in derating engine torque, the first torque limiter based on the first delta temperature and the first temperature rate of change; and
    a means for derating engine torque based on the first torque limiter.

14. The method of claim 13 further comprising means for controlling a maximum torque output of the engine based on the first torque limiter.

15. A system for use with an internal combustion engine to control engine temperature by derating engine torque, the system comprising:
    a sensor for determining a first engine temperature during operation of the engine; and
    an engine control module configured to calculate a first temperature rate of change for the engine, the first temperature rate of change corresponding with a change in engine temperature over a first period of time, the engine control module determining a first torque limiter for use in derating engine torque, the first torque limiter based on the first temperature rate of change.

16. The system of claim 15 wherein the engine control module calculates a first delta temperature equal to a difference in temperature between the first engine temperature and a predefined operating temperature limit, the torque limiter based on the first delta temperature and the first temperature rate of change.

17. The system of claim 16 wherein the engine control module calculates a second delta temperature equal to a difference in temperature between a second engine temperature determined during operation of the engine and the predefined temperature limit, the second delta temperature less than the first delta temperature and less than a predefined delta temperature limit, the engine control module calculating a second torque limiter and derating engine torque based on the second torque limiter, wherein the second torque limiter increases engine torque output relative to the engine derating caused by the first torque estimate.

18. The system of claim 16 wherein the engine control module calculates a second delta temperature equal to a difference in temperature between a second engine temperature determined during operation of the engine and the predefined temperature limit, the second delta temperature greater than a predefined delta temperature limit, the engine control module calculating a second torque limiter and derating engine torque based on the second torque limiter, wherein the second torque limiter at least maintains engine torque output derated by the first torque estimate.

19. The system of claim 18 wherein the engine control module calculates a second temperature rate of change for the engine, the second temperature rate of change corresponding with a change in engine temperature over a second period of time, the second torque limiter based on the second delta temperature and the second temperature rate of change.

20. The system of claim 16 wherein the engine control module selects the first torque limiter from a look-up table including a percentage value for the first torque limiter as a function of the first delta temperature and the first temperature rate of change.

* * * * *